Figure 1:
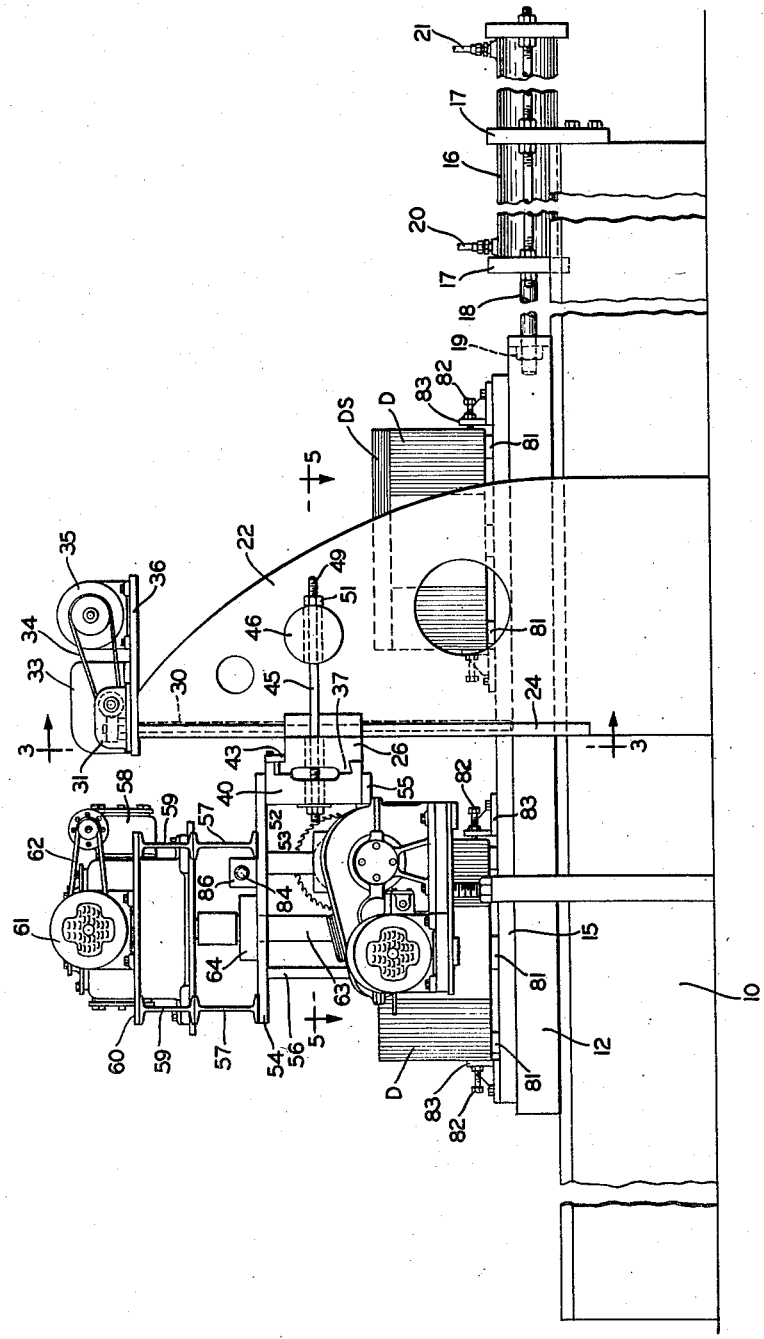

Aug. 27, 1957 C. A. BRAUCHLER 2,803,869
MULTIPLE SAWS FOR CUTTING DIE BLOCK SHANKS
Filed April 19, 1954 4 Sheets-Sheet 1

INVENTOR.
Charles A.Brauchler
BY Frease & Bishop
ATTORNEYS

INVENTOR.
Charles A. Brauchler
BY Frease & Bishop
ATTORNEYS

INVENTOR.
Charles A. Brauchler
BY
Frease & Bishop
ATTORNEYS

United States Patent Office 2,803,869
Patented Aug. 27, 1957

2,803,869

MULTIPLE SAWS FOR CUTTING DIE BLOCK SHANKS

Charles A. Brauchler, Canton, Ohio

Application April 19, 1954, Serial No. 424,080

5 Claims. (Cl. 29—70)

The invention relates to multiple saws and more particularly to multiple saw apparatus for cutting the shanks upon die blocks such as are used in forging hammers and presses.

In the production of large forgings in forging hammers or presses, the die blocks in which the forgings are formed are provided with dove tail shanks fitted into similarly shaped grooves in the bed and movable head of the forging hammer or press in which the forgings are made.

Under present practice it is customary to machine these dove tail shanks upon a planer. As these die blocks are extremely large, often weighing from 6 to 8 tons apiece, the machining of the dove tail shanks thereon by means of a planer is a very long and costly procedure.

Furthermore, the steel from which such die blocks are made is very expensive, and a considerable amount of this expensive metal is wasted by cutting the same away in the machining operation upon a planer.

It is an object of the present invention to provide a multiple saw apparatus by means of which the above disadvantages may be overcome.

Another object is to provide such apparatus for forming the dove tail shanks upon die blocks in a relatively short period of time as compared with present practice.

A further object is to provide apparatus of this character by means of which there is no waste of the expensive steel from which the die blocks are formed, the metal removed from the die block at each side of the dove tail shank being removed in a single piece which may be used for various purposes.

A still further object of the invention is to provide such an apparatus comprising an elongated bed, a table movable longitudinally upon the bed, means for mounting a die block upon the table, multiple saws located in the path of the die block for cutting a dove tail shank upon the die block, and means for moving the table, with the die block thereon, relative to the multiple saws.

Another object is to provide such an apparatus in which the cutting of the die block is accomplished by means of circular saws, two of which are mounted to rotate in the same horizontal plane, and two of which are mounted to rotate in downwardly converging upright planes.

Still another object is to provide such an apparatus having means for adjusting the saws vertically and horizontally.

Figure 2:
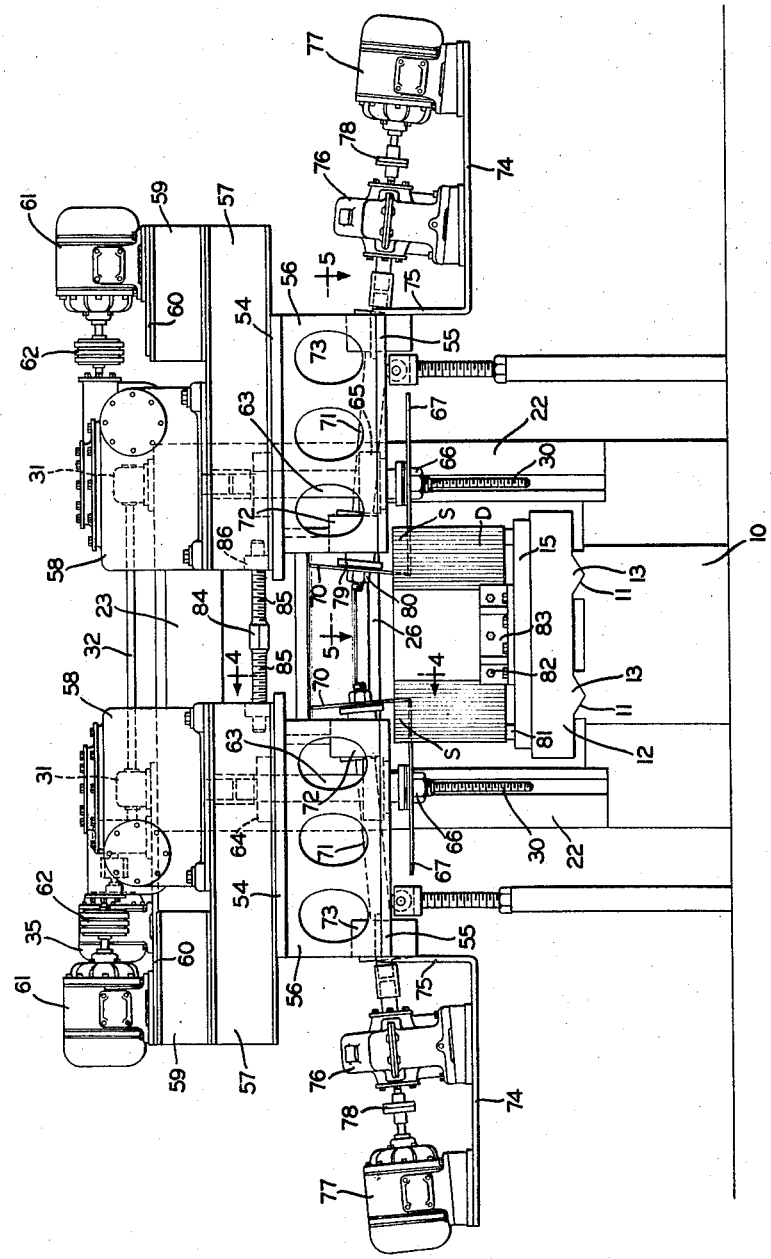
Figure 3:
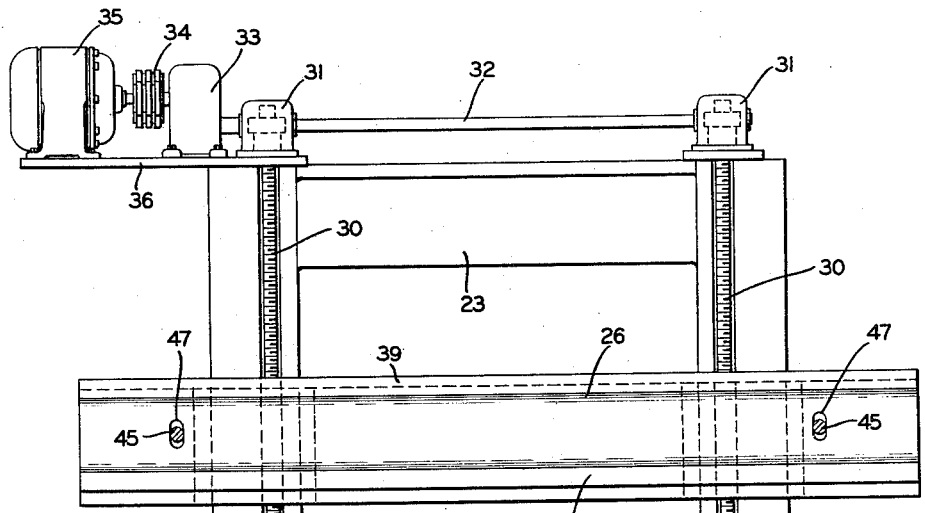
Figure 3:
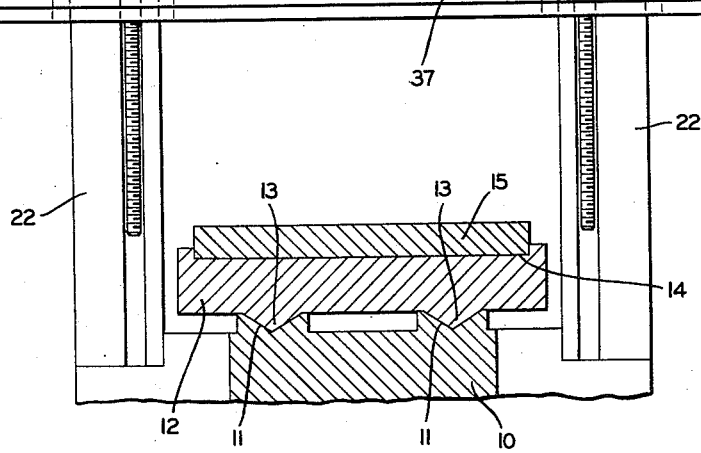
Figure 4:
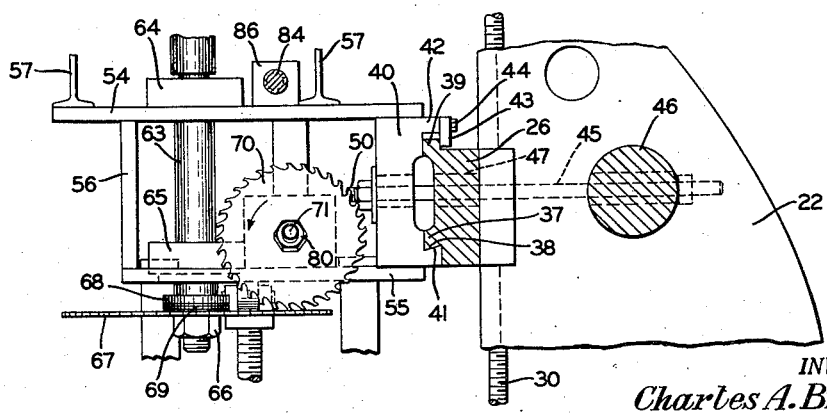
Figure 5:
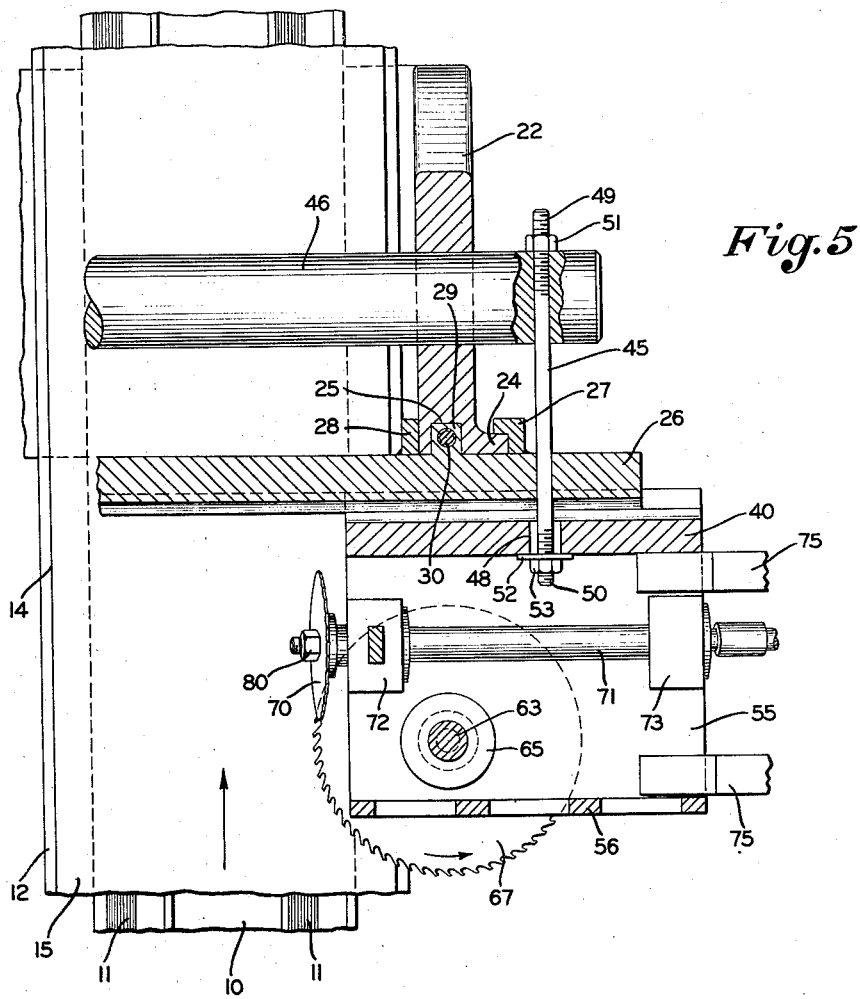
Figure 6:
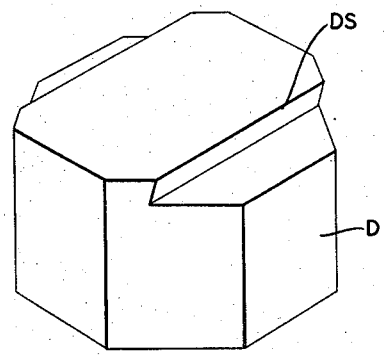

These and other objects, apparent from the drawings and following description, may be attained, the above described difficulties overcome and the advantages and results obtained, by the apparatus, construction, arrangement and combinations, sub-combinations and parts which comprise the present invention, a preferred embodiment of which, illustrative of the best mode in which applicant has contemplated applying the principle, being set forth in detail in the following description and illustrated in the accompanying drawings, in which:

Fig. 1 is a side elevation of a multiple saw machine embodying the invention;

Fig. 2 an end elevation of the machine;

Fig. 3 an enlarged, transverse, sectional view showing the mechanism for adjusting the saws vertically, taken as on the line 3—3, Fig. 1;

Fig. 4 an enlarged fragmentary, sectional view showing one group or unit of the circular saws taken as on the line 4—4, Fig. 2;

Fig. 5 an enlarged fragmentary, horizontal, sectional view taken as on the line 5—5, Figs. 1 and 2; and, Fig. 6 a perspective view of a die block with dove tail shank cut thereon.

Referring now more particularly to the embodiment of the invention illustrated in which similar numerals refer to similar parts throughout, the apparatus includes an elongated bed 10, which, as illustrated, may be a solid block of steel having the spaced, shallow V-shaped guide grooves 11 in its upper surface.

The table 12 may be in the form of an elongated, rectangular slab of steel having the shallow V-shaped ribs 13 on its under surface slidably mounted within the guide grooves 11 in the top of the bed. As best shown in Fig. 3, the table 12 may have an elongated, rectangular recess 14 in its upper surface within which is mounted the bed plate 15 in the form of a heavy plate of steel of suitable size and shape to receive one or more die blocks to be processed in the apparatus.

For the purpose of moving the table longitudinally upon the bed, a double acting, hydraulic cylinder 16 of suitable length to move the table the entire length of the bed, may be mounted at one end of the bed as by the bracket plates 17, the piston rod 18 of said cylinder being connected to the adjacent end of the table 12 as indicated at 19 in Fig. 1.

Fluid may be selectively admitted to opposite ends of the cylinder 16 as through the fluid lines 20 and 21 for moving the table 12 longitudinally upon the bed 10 to the right and to the left respectively, as viewed in Fig. 1.

Any usual and well known valve mechanism (not shown) may be interposed between the fluid lines 20 and 21 and the source of fluid pressure supply in order to operate the cylinder so as to move the table at any desired speed, and in either direction upon the bed.

At a point intermediate the ends of the bed, a pair of upright frame members 22 are rigidly mounted at opposite sides of the bed 10. These frame members support the circular saw units and means for adjusting the same vertically and horizontally.

A cross bar 23 is integrally attached to the upper ends of the frame members 22 in order to brace the same and hold them in rigidly spaced relation. A vertical guide rib 24 is formed at one edge of each of the frame members 22 and a vertical guide groove 25 is formed in the same edge of each frame member 22.

A horizontal cross head 26 is vertically movable upon the frame members 22. This cross head is slidably mounted upon the frame members 22, the angular flanges 27, connected to the cross head 26, engaging over the vertical ribs 24 on the outer sides of the frame members 22, the straight flanges 28 slidably engaging the inner surfaces of the frame members and the nut portions 29 of the cross head being slidable within the vertical grooves 25 of the frame members.

Adjusting screws 30 are threaded through the nut portions 29 of the cross head 26 and depend from the gear box 31 mounted upon the upper ends of the vertical frame members 22. The two adjusting screws 30 are geared together through a horizontal shaft 32 having suitable gear connections, such as worm gears or the like, with the upper ends of the shafts 30, within the gear box.

The shaft 32 is connected to the gear reduction 33 which is driven, through belt gearing 34, by the motor 35. This motor and reduction gearing are supported upon a bracket shelf 36 mounted upon the upper end of one of the frame members 22.

It will be obvious that by operation of the motor 35, both of the adjusting screws 30 will be rotated in unison and through the nuts 29 will raise or lower the cross head 26 upon the side frames 22.

The cross head 26 has a horizontal guide rib 37 upon its outer surface, the lower edge thereof being shown as dove tailed, as at 38, and the upper edge 39 thereof extending above the top of the cross head, as best shown in Figs. 1 and 4.

The circular saw units and the driving means therefor are separately mounted upon the cross head 26, so that they may be adjusted horizontally toward and from each other, as will be later described. For this purpose, a spaced pair of blocks 40 are horizontally, adjustably mounted upon the cross head 26, each block 40 supporting one of the horizontal and upright circular saw units.

Each of the blocks 40 has a dove tail groove 41 in its lower edge, engaging the dove tail lower edge 38 of the rib 37 upon the cross head, and is provided at its upper edge with a horizontal rib 42 to which a vertical flange 43 is attached as by screws 44, said vertical flange engaging over the inner end of the rib 39 on the top of the cross head.

As best shown in Fig. 4, it will be seen that there is a slight space between the top of the rib 39 and the bottom of the rib 42 in order to provide for a slight vertical adjustment of each block 40 upon the cross head. The blocks 40 are adapted to be normally rigidly connected in adjusted position upon the cross head 26 by means of bolts 45 located through a rod 46 rotatably mounted within the frame members 22.

In order to provide for a slight vertical and horizontal adjustment of each block 40 upon the cross head 26, vertically elongated apertures 47 are formed in the cross head 26, to receive the bolts 45, and horizontally elongated apertures 48 are provided in the blocks 40 to receive these bolts.

Opposite ends of each bolt 45 may be screw threaded, as at 49 and 50, to receive nut 51, washer 52 and nut 53 for holding the blocks 40 rigidly in adjusted position upon the cross head. Upper and lower, horizontally disposed plates 54 and 55 are welded, or otherwise rigidly attached, to the upper and lower edges of each block 40 and are connected at their outer edge portions by the vertical plate 56 which is welded or otherwise rigidly attached thereto.

A spaced pair of I-beams 57 is fixed upon the upper surface of each upper plate 54, and a gear reduction 58 is mounted upon the inner end portions of each of these I-beams. At the outer end portions of the I-beams 57, shorter I-beams 59 are mounted and support a shelf or table 60 upon which is located a motor 61 connected by belt drive 62 with the corresponding gear reduction 58.

A vertical shaft 63 depends from each gear reduction 58 and is journalled through suitable bearings 64 and 65 upon the upper and lower plates 54 and 55 respectively. The lower end portion of each shaft 63 is screw threaded to receive a nut 66 by means of which the horizontal circular saw 67 is clamped thereon against the shoulder 68 of the shaft. Shims 69 may be placed between the saw blade and the shoulder 68, if desired, to vertically adjust the position of the saw blade 67 upon the shaft.

Each unit or group of saws comprise a horizontal saw 67 and an upright saw 70, located at a slight angle to the vertical so that with the accompanying horizontal saw the desired cuts can be made in one side of a die block to form one side of a dove tail shank thereon. Each upright saw 70 is mounted upon an inclined shaft 71 journalled in suitable bearings 72 and 73 upon the lower plate 55.

A bracket 74 is suspended from the outer end of each lower plate 55, as by the straps 75, and supports a gear reduction 76, connected directly to the corresponding shaft 71, and a motor 77 connected directly to the gear reduction as by clutch 78. Each upright, circular saw blade 70 is clamped against the shoulder 79 upon the shaft 71, as by a nut 80 located upon the screw threaded end portion of the shaft.

In the operation of the apparatus to cut dove tail shanks upon a die block, one or more die blocks, as indicated at D, are properly positioned upon the table, blocked up to the proper height as by blocks 81 and rigidly clamped against movement upon the table as by the clamping screws 82 in the clamping brackets 83.

The saw blades 67 and 70 are adjusted to the proper height to make the cuts at the desired points by means of the adjusting screws 30 which are operated by the motor 35. The two groups or units of saw blades are adjusted horizontally relative to each other by means of the turnbuckle 84, the oppositely threaded ends 85 of which are screwed into the nuts 86 fixedly mounted upon the top plates 54.

The motors 61 and 77 are then started, to rotate the upright and horizontal saw blades respectively, and fluid is admitted through the fluid line 20 to the inner end of the fluid cylinder 16 to move the table 12 to the right, as viewed in Fig .1.

As the die block is moved into engagement with the saw blades, horizontal and inclined upright cuts will be made in each side of the die block near the top thereof, removing a slab of metal, as indicated at S, from each side of the die block, forming the dove tail shank DS thereon.

This operation may be carried out in only a fraction of the time required for machining upon a planer, as in usual practice, and all of the expensive metal removed from each side of the dove tail shank is removed in a single piece so that it may be used for other purposes.

Where two or more die blocks are mounted upon the table, as shown in Fig. 1, after the first die block has been cut and has moved to the right, as viewed in said figure, the clamping screws 82 therefore may be released and the finished die block removed from the table, while the second die block is being cut, thus saving considerable time.

After the second die block has been cut, the table may be quickly moved back to the starting point, by reversing the operation of the fluid cylinder 16, and while this finished die block is being removed from the table in this position another die block to be cut may be placed upon the table, blocked up and clamped in adjusted position, to the right of the die block being removed.

Then, during operation of the apparatus to cut the dove tail shank upon this die block, a second die block may be placed upon the slowly moving table and properly blocked up and clamped in adjusted position, and the operation repeated as above described.

From the above it will be evident that in a single movement of the table of the apparatus in one direction, the complete dove tail shank is formed upon the top of the die block by a dual cut in each side thereof, removing all of the metal from each cut in a single piece which may be used for other purposes. Thus there is no waste of the expensive die steel and the operation is performed with a minimum of time and labor.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful

I claim:

1. Multiple saw apparatus for cutting dove-tail shanks upon relatively heavy die blocks for use in forging hammers and presses, said apparatus comprising an elongated horizontal bed, a table longitudinally movable upon the bed, means for mounting a die block upon the table, upright frame members on opposite sides of the bed intermediate the ends thereof, a cross head vertically slidable upon said upright frame members above and transversely of the table, means for moving said cross head vertically, a spaced pair of blocks horizontally movable upon the cross head, means for moving the blocks horizontally in unison toward and from each other, a horizontal circular saw blade and a substantially upright saw blade journalled upon each block, the lower edge of each upright saw blade and the inner edge of the corresponding horizontal saw blade being located in a horizontal line extending longitudinally through the die block, means for rotating all of said circular saw blades, and means for moving the table longitudinally upon the bed, whereby the saw blades will cut intersecting horizontal and upright kerfs in each side of the die block forming a shank on the upper side of the die block.

2. Multiple saw apparatus for cutting dove-tail shanks upon relatively heavy die blocks for use in forging hammers and presses, said apparatus comprising an elongated horizontal bed, a table longitudinally movable upon the bed, means for mounting a die block upon the table, upright frame members on opposite sides of the bed intermediate the ends thereof, a cross head vertically slidable upon said upright frame members above and transversely of the table, means for moving said cross head vertically, a spaced pair of blocks horizontally movable upon the cross head, means for moving the blocks horizontally in unison toward and from each other, a horizontal circular saw blade and a substantially upright downwardly and inwardly inclined saw blade journalled upon each block, the lower edge of each upright saw blade and the inner edge of the corresponding horizontal saw blade being located in a horizontal line extending longitudinally through the die block, means for rotating all of said circular saw blades, and means for moving the table longitudinally upon the bed, whereby the saw blades will cut intersecting horizontal and upright downwardly and inwardly inclined kerfs in each side of the die block forming a dove-tail shank on the upper side of the die block.

3. Multiple saw apparatus for cutting dove-tail shanks upon relatively heavy die blocks for use in forging hammers and presses, said apparatus comprising an elongated horizontal bed, a table longitudinally movable upon the bed, means for mounting a die block upon the table, upright frame members on opposite sides of the bed intermediate the ends thereof, a cross head vertically slidable upon said upright frame members above and transversely of the table, means for moving said cross head vertically, a spaced pair of blocks horizontally movable upon the cross head, means for moving the blocks horizontally in unison toward and from each other, a horizontal circular saw blade and a substantially upright saw blade journalled upon each block, each upright saw blade being located slightly forward of the corresponding horizontal saw blade, the lower edge of each upright saw blade and the inner edge of the corresponding horizontal saw blade being located in a horizontal line extending longitudinally through the die block, means for rotating all of said circular saw blades, and means for moving the table longitudinally upon the bed, whereby the saw blades will cut intersecting horizontal and upright kerfs in each side of the die block forming a shank on the upper side of the die block.

4. Multiple saw apparatus for cutting dove-tail shanks upon relatively heavy die blocks for use in forging hammers and presses, said multiple saw apparatus comprising an elongated horizontal bed, a table mounted for longitudinal movement upon the bed, a double-acting fluid cylinder operatively connected to the table, valve means controlling the cylinder for moving the table longitudinally upon the bed, means for mounting a die block upon the table, upright frame members located on opposite sides of the bed intermediate the ends thereof and extending above the table, a cross head vertically slidably mounted upon said upright frame members above and transversely of the table, means for moving said cross head vertically, a spaced pair of blocks mounted upon the cross head, means for independently moving each block vertically and horizontally upon the cross head, means for moving the blocks horizontally in unison toward and from each other, a horizontal circular saw blade and an inwardly and downwardly inclined upright circular saw blade journalled upon each block, the lower edge of each upright saw blade and the inner edge of the corresponding horizontal saw blade being located in a horizontal line extending longitudinally through the die block, and means for rotating all of said circular saw blades, whereby the saw blades will cut intersecting horizontal and upright kerfs in each side of the die block forming a dove-tail shank on the upper side of the die block.

5. Multiple saw apparatus for cutting dove-tail shanks upon relatively heavy die blocks for use in forging hammers and presses, said multiple saw apparatus comprising an elongated horizontal bed, a table mounted for longitudinal movement upon the bed, a double-acting fluid cylinder operatively connected to the table, valve means controlling the cylinder for moving the table relatively slowly in one direction and relatively quickly in reverse direction, means for mounting a die block upon the table, upright frame members located on opposite sides of the bed intermediate the ends thereof and extending above the table, a cross head vertically slidably mounted upon said upright frame members above and transversely of the table, means for moving said cross head vertically, a spaced pair of blocks mounted upon the cross head, means for independently moving each block vertically and horizontally upon the cross head, means for moving the blocks horizontally in unison toward and from each other, a vertical shaft journalled upon each block, a horizontal circular saw blade upon each vertical shaft, a motor supported upon each block and operatively connected to the corresponding vertical shaft, an upwardly and inwardly inclined shaft journalled upon each block, a downwardly and inwardly inclined upright circular saw blade upon each inclined shaft, and a motor supported upon each block operatively connected to the corresponding inclined shaft, the lower edge of each upright saw blade and the inner edge of the corresponding horizontal saw blade being located in a horizontal line extending longitudinally through the die block, and means for rotating all of said circular saw blades, whereby the saw blades will cut intersecting horizontal and upright kerfs in each side of the die block forming a dove-tail shank on the upper side of the die block.

References Cited in the file of this patent
UNITED STATES PATENTS

| | | |
|---|---|---|
| 837,660 | Blanpain et al. | Dec. 4, 1906 |
| 1,968,091 | Nash | July 31, 1934 |
| 2,393,696 | Kraut et al. | Jan. 29, 1946 |
| 2,672,896 | Shurtliff | Mar. 23, 1954 |